(12) United States Patent
Cho et al.

(10) Patent No.: US 12,249,074 B2
(45) Date of Patent: Mar. 11, 2025

(54) HUMAN POSE ANALYSIS SYSTEM AND METHOD

(71) Applicant: Hinge Health, Inc., San Francisco, CA (US)

(72) Inventors: Dongwook Cho, Montreal (CA); Maggie Zhang, Montreal (CA); Paul Kruszewski, Montreal (CA)

(73) Assignee: Hinge Health, Inc., San Francisco, CA (US)

( * ) Notice: Subject to any disclaimer, the term of this patent is extended or adjusted under 35 U.S.C. 154(b) by 656 days.

(21) Appl. No.: 17/256,307

(22) PCT Filed: Jun. 27, 2019

(86) PCT No.: PCT/CA2019/050887
§ 371 (c)(1),
(2) Date: Dec. 28, 2020

(87) PCT Pub. No.: WO2020/000096
PCT Pub. Date: Jan. 2, 2020

(65) Prior Publication Data
US 2021/0264144 A1 Aug. 26, 2021

Related U.S. Application Data

(60) Provisional application No. 62/691,818, filed on Jun. 29, 2018.

(51) Int. Cl.
*G06T 7/11* (2017.01)
*G06F 18/214* (2023.01)
(Continued)

(52) U.S. Cl.
CPC ............. *G06T 7/11* (2017.01); *G06F 18/214* (2023.01); *G06N 3/045* (2023.01); *G06V 10/454* (2022.01);
(Continued)

(58) Field of Classification Search
CPC ............. G06T 7/11; G06T 2207/20081; G06T 2207/20084; G06T 2207/30196;
(Continued)

(56) References Cited

U.S. PATENT DOCUMENTS 8,437,506 B2    5/2013   Williams et al.
2015/0347822 A1* 12/2015  Zhou ...................... G06V 10/82
                                                      382/118
(Continued)

FOREIGN PATENT DOCUMENTS

CN    105069423    11/2015
CN    104346607    12/2017
(Continued)

OTHER PUBLICATIONS

Zhang et al., "Joint Face Detection and Alignment Using Multitask Cascaded Convolutional Networks," Oct. 26, 2016, IEEE Signal Processing Letters, vol. 23, pp. 1499-1503.*

(Continued)

*Primary Examiner* — Leon Viet Q Nguyen
(74) *Attorney, Agent, or Firm* — Perkins Coie LLP (57) ABSTRACT

System and method for extracting human pose information from an image, comprising a feature extractor connected to a database, a convolutional neural network (CNN) with a plurality of CNN layers. Said system/method further comprising at least one of the following modules: a 2D body skeleton detector for determining 2D body skeleton information from the human-related image features; a body silhouette detector for determining body silhouette information from the human-related image features; a hand silhouette detector for determining hand silhouette detector from the human-related image features; a hand skeleton detector for determining hand skeleton from the human-related image features; a 3D body skeleton detector for determining (Continued)

3D body skeleton from the human-related image features; and a facial keypoints detector for determining facial keypoints from the human-related image features.

15 Claims, 8 Drawing Sheets

(51) Int. Cl.
  *G06N 3/045* (2023.01)
  *G06V 10/44* (2022.01)
  *G06V 10/764* (2022.01)
  *G06V 10/82* (2022.01)
  *G06V 40/10* (2022.01)
  *G06V 40/16* (2022.01)

(52) U.S. Cl.
  CPC ............ *G06V 10/764* (2022.01); *G06V 10/82* (2022.01); *G06V 40/10* (2022.01); *G06V 40/103* (2022.01); *G06V 40/171* (2022.01)

(58) Field of Classification Search
  CPC ... G06T 7/73; G06F 18/214; G06F 18/24133; G06N 3/045; G06N 3/084; G06N 3/08; G06V 10/454; G06V 10/764; G06V 10/82; G06V 40/10; G06V 40/103; G06V 40/171; A61B 5/1116; A61B 5/1128; A61B 2576/00
  See application file for complete search history.

(56) References Cited

U.S. PATENT DOCUMENTS

| | | | |
|---|---|---|---|
| 2017/0270593 A1* | 9/2017 | Sherman | G06Q 30/0251 |
| 2018/0018554 A1* | 1/2018 | Young | G06N 3/045 |
| 2018/0024641 A1* | 1/2018 | Mao | A63F 13/428 |
| | | | 382/103 |
| 2018/0116620 A1* | 5/2018 | Chen | G06T 7/136 |
| 2018/0150681 A1 | 5/2018 | Wang et al. | |
| 2018/0276454 A1* | 9/2018 | Han | G06V 40/166 |
| 2019/0251340 A1* | 8/2019 | Brown | G06N 3/045 |

FOREIGN PATENT DOCUMENTS

| | | |
|---|---|---|
| CN | 104346607 B | 12/2017 |
| JP | 2008204384 A | 9/2008 |
| JP | 2017157138 A | 9/2017 |

OTHER PUBLICATIONS

Choi, Jinyoung, et al., "Human Body Orientation Estimation Using Convolutional Neural Network", arXiv, the U.S., Cornell University; https://arxiv.org/abs/1609.01984, Sep. 7, 2016, pp. 1-5.

Kengo, "The accuracy estimation of the doubtful operation recognition technique of the person who utilized the machine learning based on attitude presumption technology", IEICE Technical Report, Japan, vol. 117, No. 485, Mar. 1, 2018, pp. 89-94.

Li, Sijin et al., "Heerogeneous Multi-task Learning for Human Pose Estimation with Deep Convolutional Neural Network", 2014 IEEE Conference On Computer Vision and Pattern Recognition Workshops, IEEE, Jun. 23, 2014, pp. 488-495.

Ranjan, Rajeev et al., "HyperFace: A Deep Multi-Task Learning Framework for Face Detection, Landmark Localization, Pose Estimation, and Gender Recognition", Retrieved from the Internet: URL:https://arxiv.org/pdf/1603.01249v2 [retrieved on Feb. 6, 2019], May 11, 2016.

Toshev, A. et al., "DeepPose: Human Pose stimation via Deep Neural Networks", 2014 IEEE Conference On Computer Vision and Pattern Recognition, IEEE, Jun. 23, 2014 (Jun. 23, 2014), XP032649134, Jun. 23, 2014, pp. 1653-1660.

Wang, Keze et al., "Human Pose Estimation from Depth Images via Inference Embedded Multi-task Learning", Proceedings of The 2017 ACM On Conference On Information and Knowledge Management, CIKM '17, ACM Press, New York, New York, USA,, Oct. 1, 2016, pp. 1227-1236.

Wei, S-E et al., "Convolutional Pose Machines", 2016 IEEE Conference On Computer Vision and Pattern Recognition (CVPR), IEEE, XP033021664, Jun. 27, 2016, pp. 4724-4732.

Ranjan, Rajeev, et al., "HyperFace: A Deep Multi-Task Learning Framework for Face Detection, Landmark Localization, Pose Estimation, and Gender Recognition", IEEE Transactions on Pattern Analysis and Machine Intelligence, vol. 41, No. 1, USA, Dec. 8, 2017, pp. 121-135.

* cited by examiner

HUMAN POSE ANALYSIS SYSTEM AND METHOD

CROSS-REFERENCE TO RELATED APPLICATIONS

This application is a National Stage of PCT/CA2019/050887, filed Jun. 27, 2019, which claims priority to and the benefit of U.S. Provisional Patent Application No. 62/691,818 filed on Jun. 29, 2018, the disclosure of which is incorporated herein by reference in its entirety.

TECHNICAL FIELD

The present invention relates to the field of human pose analysis, and more particularly to human pose analysis systems and methods using lightweight convolutional neural networks (CNNs).

BACKGROUND

Early approaches for human pose analysis use visible markers attached on a person's body to be recognized by a camera or use images captured by depth sensor to understand shape of person or localize body parts. There have been attempts to analyze commonly available color images using classical computer vision techniques such as image feature detection approaches or structural analysis. These methods were not robust enough to handle a variety of natural images.

More recently robust methods to localize human body joints and construct human skeletons in 2D image space were proposed. These methods are implemented based on deep neural network models that are trained with large scale image database.

Multiple aspects of analysis can be made for a person in an image such as body skeleton in image, body shape, 3-dimensional body skeleton, detailed poses of each body part such as hands. Most of existing methods focus on analysing a single aspect of a person. Some methods localize a person and segment the body silhouette in image. Other methods localize only a person's hands and their joints. A unified analysis of a person's image makes possible a better understanding of human pose.

Also, most of robust methods require heavy computations for real-time analysis, which prohibits the implementation in inexpensive devices such as consumer electronics or mobile devices.

Therefore, there is a need for an improved method and system for human pose analysis.

SUMMARY

According to a first broad aspect, there is provided a system for extracting human pose information from an image, comprising: a feature extractor for extracting human-related image features from the image, the feature extractor being connectable to a database comprising a dataset of reference images and provided with a first convolutional neural network (CNN) architecture including a first plurality of CNN layers, each convolutional layer applies convolutional operation to its input data using trained kernel weights; and at least one of the following modules: a 2D body skeleton detector for determining 2D body skeleton information from the human-related image features; a body silhouette detector for determining body silhouette information from the human-related image features; a hand silhouette detector for determining hand silhouette detector from the human-related image features; a hand skeleton detector for determining hand skeleton from the human-related image features; a 3D body skeleton detector for determining 3D body skeleton from the human-related image features; and a facial keypoints detector for determining facial keypoints from the human-related image features, wherein each one of the 2D body skeleton detector, the body silhouette detector, the hand silhouette detector, the hand skeleton detector, the 3D body skeleton detector and the facial keypoints detector is provided with a second convolutional neural network (CNN) architecture including a second plurality of CNN layers.

In one embodiment of the system, the feature extractor comprises: a low-level feature extractor for extracting low-level features from the image; and an intermediate feature extractor for extracting intermediate features, the low-level features and the intermediate features forming together the human-related image features.

In one embodiment of the system, at least one of the first and second architecture comprises a deep CNN architecture.

In one embodiment of the system, one of the first and second CNN layers comprise lightweight layers.

According to another broad aspect, there is provided a method for extracting human pose information from an image, comprising: receiving an image; extracting human-related image features from the image using a feature extractor, the feature extractor being connectable to a database comprising a dataset of reference images and provided with a first convolutional neural network (CNN) architecture including a first plurality of CNN layers, each convolutional layer applies convolutional operation to its input data using trained kernel weights; and determining the human pose information using at least one of the following modules: a 2D body skeleton detector for determining 2D body skeleton information from the human-related image features; a body silhouette detector for determining body silhouette information from the human-related image features; a hand silhouette detector for determining hand silhouette detector from the human-related image features; a hand skeleton detector for determining hand skeleton from the human-related image features; a 3D body skeleton detector for determining 3D body skeleton from the human-related image features; and a facial keypoints detector for determining facial keypoints from the human-related image features, wherein each one of the 2D body skeleton detector, the body silhouette detector, the hand silhouette detector, the hand skeleton detector, the 3D body skeleton detector and the facial keypoints detector is provided with a second convolutional neural network (CNN) architecture including a second plurality of CNN layers.

In one embodiment of the method, the feature extractor comprises: a low-level feature extractor for extracting low-level features from the image; and an intermediate feature extractor for extracting intermediate features, the low-level features and the intermediate features forming together the human-related image features.

In one embodiment of the method, at least one of the first and second architecture comprises a deep CNN architecture.

In one embodiment of the method, one of the first and second CNN layers comprise lightweight layers.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
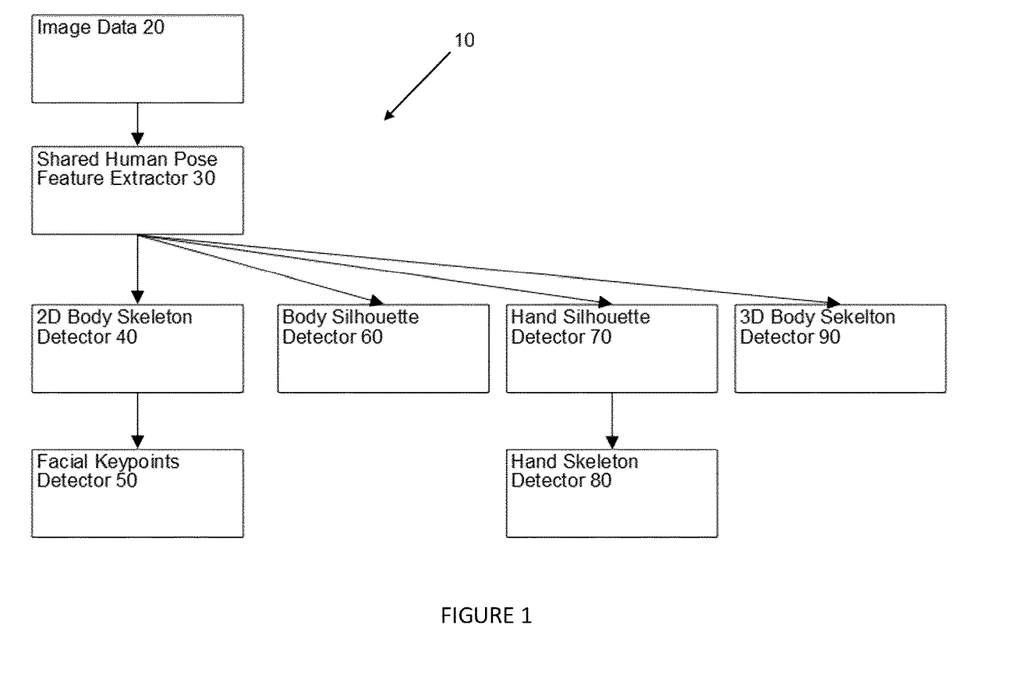
FIG. 1 is a block diagram illustrating a system for extracting human pose information from an image, the system comprising a feature extractor, a 2D body skeleton detector, a body silhouette detector, a hand silhouette detector and 3D body skeleton detector, a facial keypoint detector and a hand skeleton detector, in accordance with an embodiment.

FIG. 1 illustrates one embodiment of a system 10 for extracting human pose information from an image. The system 10 is configured for receiving images, localize humans within the received images and automatically infer human pose information from each image.

In one embodiment, the human pose information comprises geometric information of human skeletons and body part shapes. Human skeletons may be expressed by bone joint locations and/or bone orientations with lengths and body part shapes can be expressed as silhouettes and/or surface meshes with locations. For example, human pose information may include information such as 2D and/or 3D body skeletons with human joints, body shapes or silhouettes, and/or skeletons and silhouettes of body part like hand, etc.

The system 10 is configured to first extract from the images human-related image features that are learned by an image dataset and determine the human pose information from the extracted human-related image features.

In one embodiment, the human-related image features comprise primitive information related to human bodies and human body parts obtained from an image, such as points, edges, lines, contours, intensities, gradients, contrasts of small to large objects in an image, relations of those objects, etc.

In one embodiment, the data set comprises a set of reference images with and without human beings and ground-truth labels related to human body geometry. Labels may include 2D body joint locations (x,y) and visibilities (such as not available, visible, existing in image but occluded) in image; 2D hand joint locations and visibilities in image; 2D face keypoints locations and visibilities in image, a silhouette of a human body, a silhouette of a hand, 3D body joint locations, etc. It should be understood that not all reference images contained in the data set have all the labels associated thereto.

In one embodiment, the data set of reference images comprises at least tens of thousands of images for training and may be qualified as being large scale.

The system 10 uses convolutional neural network (CNN) architecture for robust estimation of the pose information. CNNs are composed of convolutional neural network layers, hereinafter referred to as convolutional layers. Each convolutional layer receives input data or processed data from previous convolutional layer(s) and sends its output data to the following layer(s) after applying a convolutional operation to its input data. In one embodiment, the output of a convolutional layer is in the form of a tensor or a multi-dimensional array.

Each convolutional layer applies convolutional operation to its input data using trained kernel weights. The training of the weights of convolutional layers is performed by back-propagation technique using the dataset of reference images. In one embodiment, each convolutional layer is configured for applying a nonlinear activation function such as a rectified linear unit (ReLU) to the input data to allow for more robust decision of CNNs. It should be understood that functions other than ReLU functions may be used by the convolutional layers.

In one embodiment, the system 10 uses deep CNNs. In one embodiment, the CNNs comprise at least three convolutional layers. In comparison to a shallow architecture with a small number of layers, a deep CNN architecture preserves more neurons or weights and possibly accommodates a variety of input data and analyzes them robustly without being influenced by noise or clutter.

In the same or another embodiment, the CNN architecture comprises lightweight convolutional layers. In this case, each convolutional layer is made "computationally light" by reducing the number of kernels and/or their size and/or by applying down-sampling. In this case, the architecture may be adequate for real-time human pose analysis performed on a low-end device.

In one embodiment, the following approach for the CNN architecture is followed.

The convolutional layers that do not significantly influence the accuracy of estimated results may be eliminated. For example, pooling layers that also perform down-sampling may be removed and a neighboring convolution layer located before a pooling layer may perform down-sampling during its convolutional operation.

A minimal input image resolution may be chosen by considering common person size in an image. For example, a person of 80×80 pixels in an image can be robustly analyzed without losing much human-related image features. A lower resolution image may present a lack of details, but it may be sufficient for a good approximation of body pose. In one embodiment, the resolution of the image is 48×48. In another embodiment, the resolution of the image is 96×96. In a further embodiment, the resolution of the image is 256×144. In still another embodiment, the resolution of the image is 400×320.

Receptive fields of a person may be considered in order to decide the number of convolutional layers and their kernel sizes by limiting the maximum resolution to be analyzed. For instance, a region with 84×84 pixels can be covered by two convolution layers with 11×11 kernels after down-sampling an input image by 4. Ten 3×3 convolution layers can cover the same region with more layers yet less computational cost.

The output depth size defined in each convolutional layer may be reduced as long as the resulting accuracy is higher than a minimum target accuracy chosen by the user. The computational cost is proportional to the kernel size in each dimension (kernel width, height, and depth) as well as output depth size. Size of weights may be decided by the multiplied sum of kernel width, height, and depth in addition to the number of biases.

A CNN model is a collection of weights and biases learned by a machine given a dataset and designed architecture. The CNN model may be chosen empirically to provide the highest accuracy.

Referring back to FIG. 1, the system comprises a feature extractor 30 in communication with a database 20. The system also comprises a 2D body skeleton detector 40, a body silhouette detector 60, a hand silhouette detector 70 and 3D body skeleton detector 90, which are all in communication with the feature extractor 30. The system 10 further comprises a facial keypoint detector 50 in communication with the 2D body skeleton detector 40 and a hand skeleton detector 80 in communication with the hand silhouette detector 70.

The database 20 comprises the data set of reference images stored therein. In one embodiment, the database 20 is stored in a memory that is comprised in the system 10. In another embodiment, the database 20 is stored in a memory that is not included in the system 10.

Figure 2:
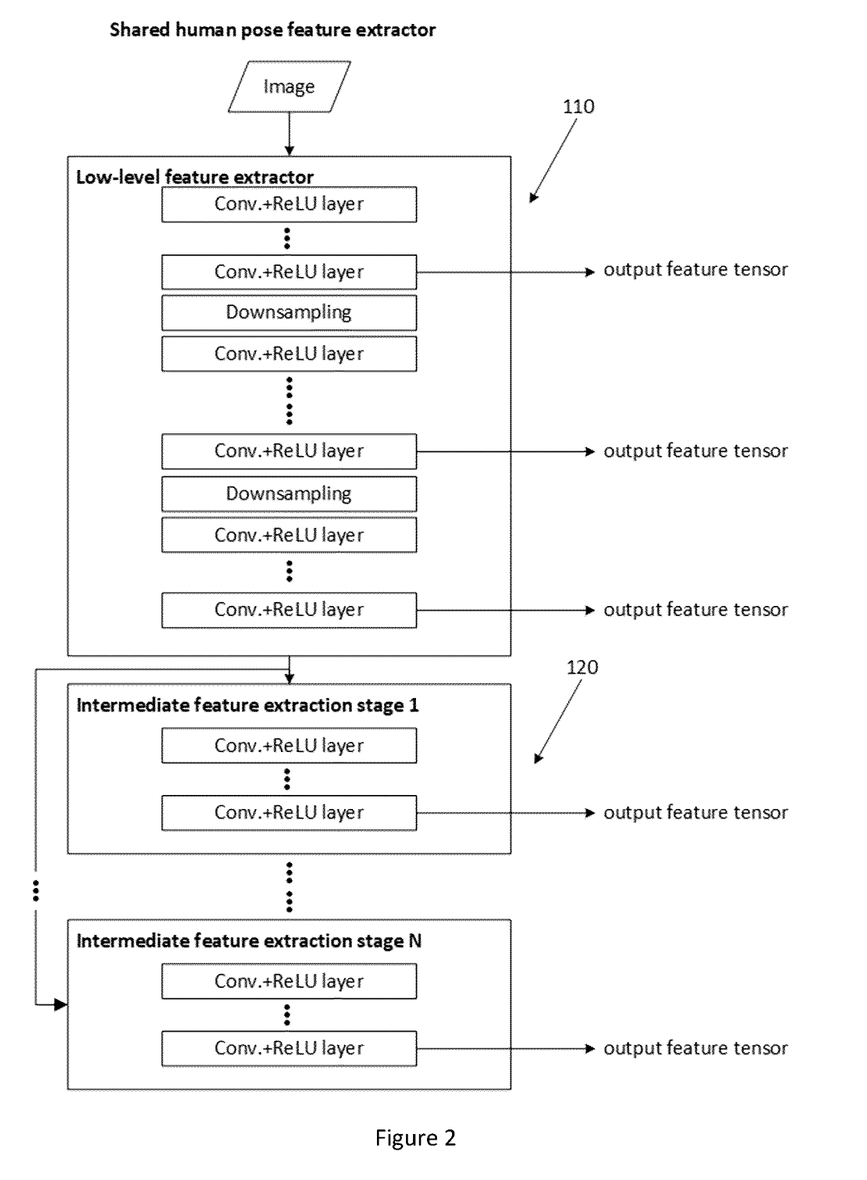
FIG. 2 is a block diagram illustrating the feature extractor of FIG. 1, in accordance with an embodiment.

As illustrated in FIG. 2, the feature extractor 30 comprises a low-level feature extractor 110 and at least one intermediate feature extractor 120.

With reference to FIG. 2, the feature extractor 30 is composed of a low-level feature extractor 110 and one or more intermediate feature extractor 120. The low-level feature extractor 110 is configured for receiving an image and extracting from the image low-level features that represent elemental characteristics of local regions in an image such as intensities, edges, gradients, curvatures, points, object shapes and/or the like. The intermediate feature extractor 120 is (are) configured for receiving the low-level features and determining intermediate features which correspond to high-level features obtained by correlating the low-level features extracted by the low-level feature extractor 110 and are related to human pose information such as shapes and/or relations of body parts. The low-level features and the intermediate features form together the human-related image features outputted by the feature extractor 30.

As illustrated in FIG. 2, the low-level extractor 110 comprises repeated blocks in different image scales and each block comprises a series of convolutional layers with ReLU activations.

The low-level feature extractor 110 preserves generic image features such as edges, contours, blobs, their orientations, or some other observations learned from large scale image dataset.

A proven CNN architecture such as Inception, VGG, and ResNet can be considered for backbone networks. Lightweight backbone networks can be designed for reduced computational cost while preserving the minimum human pose-related features as mentioned above.

The intermediate feature extractor 120 is configured for intermediate supervision when a CNN model is trained. Intermediate supervision allows for the training of a CNN model by adding loss layers in the middle layers (or output layers of intermediate feature extractors) in addition to the last output layer. In neural networks, a loss layer compares difference between the output layer and ground-truth data and propagate backward to train weights and biases in each layer.

The number of convolutional layers present in the intermediate feature extractors 120 and their parameters for each intermediate stage are tailored by the size of input image and target objects, i.e. humans, as described above. Each intermediate stage is trained using the dataset of reference images. For example, a stack of 2D joint heat map in which the human joints in an image are marked in the same location may be generated using 2D joint locations. The exact joint location on the heat map has high response value while the location has low or no response value if the distance from the joint location is farther. The ground-truth heat maps that are generated from the dataset using the annotated 2D joint locations are compared to the estimated heat maps that are inferred from the training model during the model training. The model is trained by adjusting weight and bias values by repeating forward and backward propagation process throughout the connected layers in the neural networks.

In one embodiment, by training multiple stages of the convolutional layers of the intermediate feature extractors 120, the features related to human poses are refined through deeper network layers and therefore more robust results may be obtained. In addition, the model training becomes more efficient.

The output of each layer in the low-level feature extractor 110 and the intermediate feature extractors 120 form the human-related image features which can be presented as human-related image feature tensors. Depending on the purpose, a subset of the human-related image feature tensors can be used for detailed human pose analysis.

Figure 3:
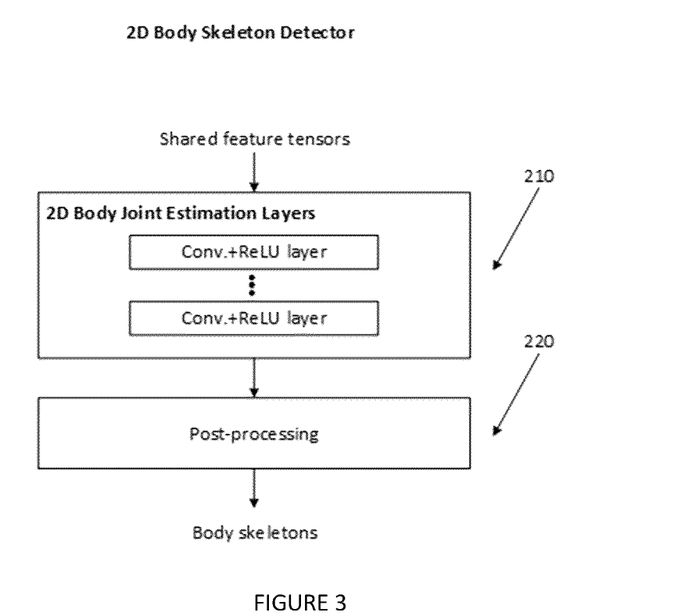
FIG. 3 is a block diagram illustrating the 2D body skeleton detector of FIG. 1, in accordance with an embodiment.

FIG. 3 illustrates one embodiment of a 2D body skeleton detector 40 which comprises a 2D body joint estimation network 210 and a post-processing module 220.

The 2D body skeleton detector 40 receives as input a subset of the human-related image features generated by the feature extractor 30 and generates 2D joint heat maps as output. The subset of the human-related image features comprises a combination of output feature tensors of different convolution layers of the feature extractor 30 that preserve distinctive features related to human joints and shapes.

In one embodiment, it may be difficult to measure the quality of each output feature tensor. In this case, the convolution layers that are close to the end of the low-level feature extractor 110 and/or the intermediate feature extractor 120 can be considered since they are normally refined throughout the convolution layers. For example, the output feature tensors of the last convolution layers in the low-level feature extractor 110 and N-th intermediate feature extractor 110 can be chosen to provide data to the 2D body skeleton detector 40. Once the input feature subset is processed, the 2D body skeleton detector 40 infers the estimated heat maps, which are used to decide the candidates of joint locations that are local maxima in the heat maps and a heat map response value is over a manually defined threshold. When a plurality of persons is present in an image, joint clustering is performed to separate the persons and construct skeletons during the post-processing step.

Figure 4:
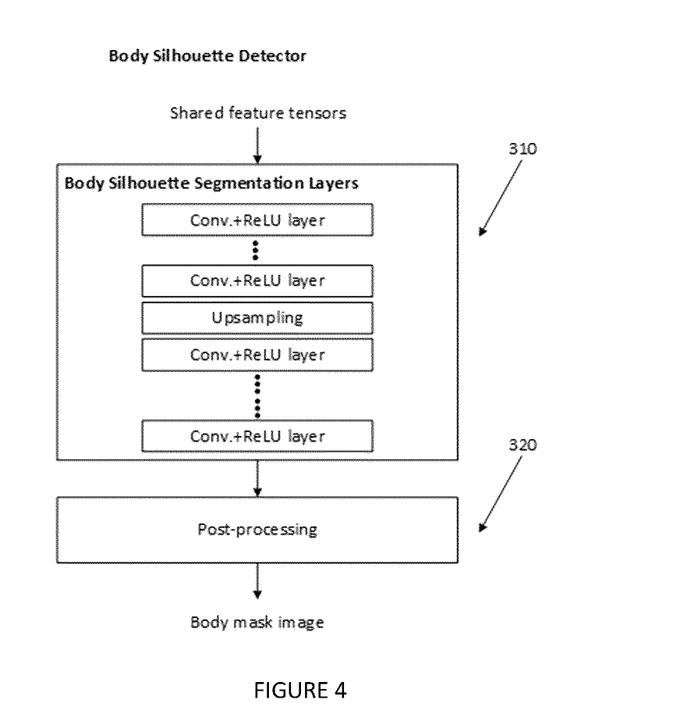
FIG. 4 is a block diagram illustrating the body silhouette detector of FIG. 1, in accordance with an embodiment.

FIG. 4 illustrates one embodiment of the body silhouette detector 60 which comprises a body silhouette segmentation module 310 comprising convolutional layers and a post-processing module 320.

The body silhouette detector 60 is configured for segmenting all the human bodies in an image and generating a mask image for human bodies. The convolutional layers of the body silhouette segmentation 310 receive the human-related image feature tensors from the feature extractor 30 and construct a body mask image with human body silhouettes. Masks are used to segment different objects in an image by applying bitwise masking to each pixel. A body mask image is a binary image where a mask value is 1 if a pixel belongs to a human and non-human pixel is 0. Since the scale of the human-related image feature tensors is reduced normally by factor of 2 to 16 compared to an input image width and height, upscaling can be performed during the convolutional operations to increase the body mask image resolution and preserve more details.

The post-processing module 320 takes the inferred mask image from the body silhouette segmentation module 310 and resizes the mask image to the same resolution as the source input image. The body mask image can then be used for identifying the location and shape of a person in an image.

Figure 5:
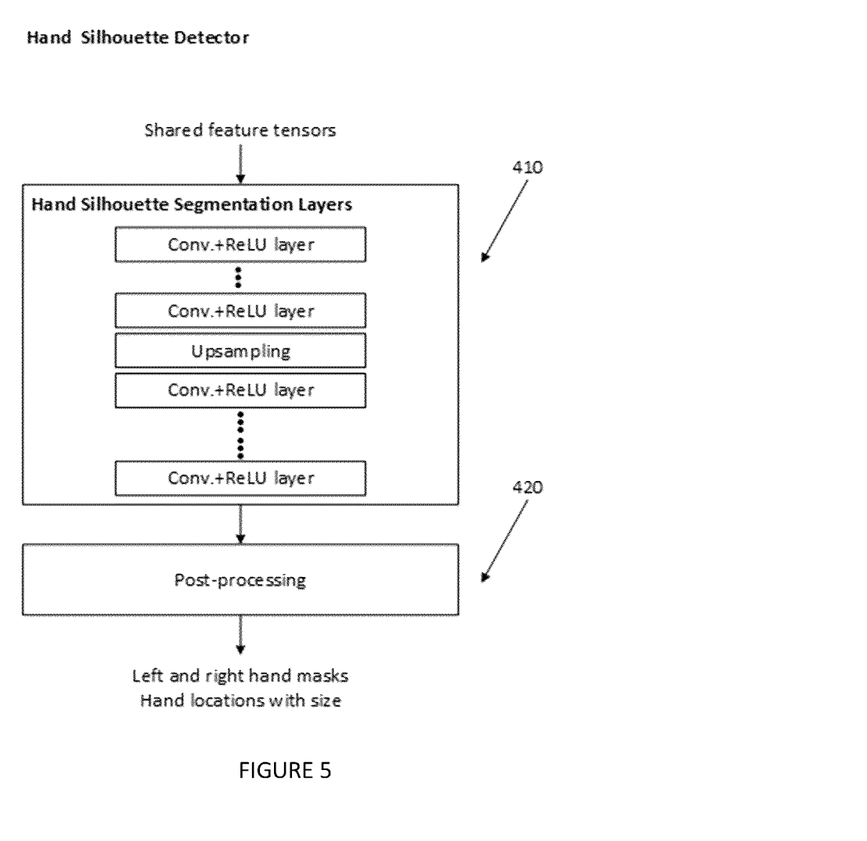
FIG. 5 is a block diagram illustrating the hand silhouette detector of FIG. 1, in accordance with an embodiment.

FIG. 5 illustrates one embodiment for the hand silhouette detector 70 which comprises a hand silhouette segmentation module 410 formed of convolutional layers and a post-processing module 420.

The hand silhouette detector module 410 is configured for segmenting the hands of the human bodies present in an input image and generates mask images for left and/or right hand similarly to the body silhouette detector 60. The convolutional layers of the hand silhouette segmentation module 410 receives the human-related image feature tensors from the feature extractor 30 and constructs hand mask images with human body silhouettes.

The post-processing module 420 is configured for resizing the inferred hand mask images. The hand mask images may then be used for identifying the location and shape of visible hands in an image. This information can be used for further analysis of each hand pose.

In one embodiment, the hand silhouette detector 70 can be merged with the body silhouette detector 60 and the merged detectors 60 and 70 can be trained together. The neural network layers in these merged detectors may be shared for more efficient computations.

Figure 6:
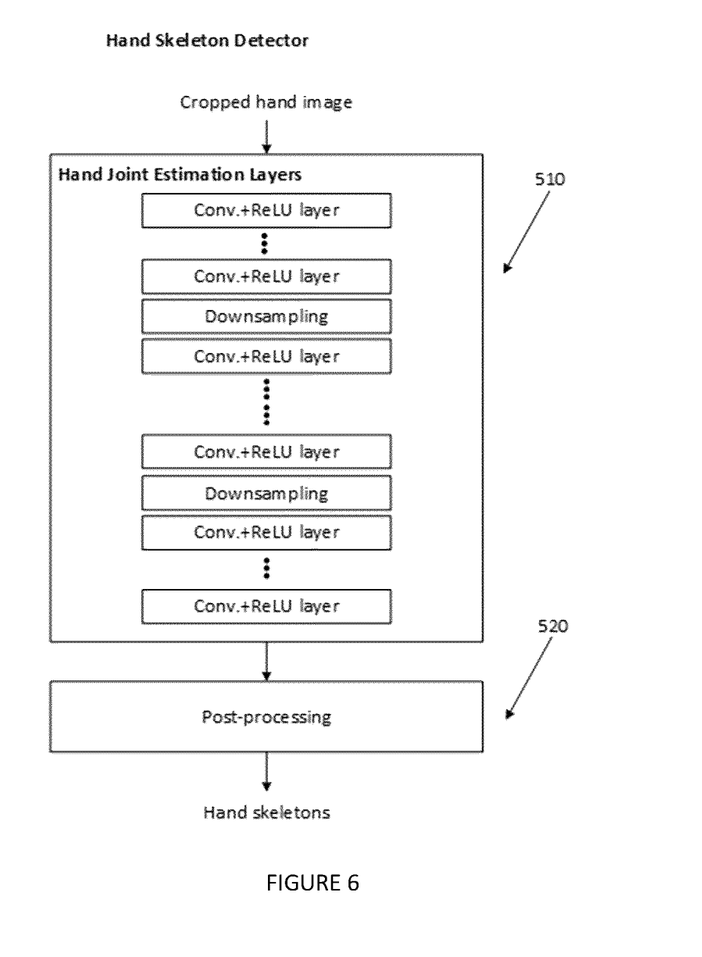
FIG. 6 is a block diagram illustrating the hand skeleton detector of FIG. 1, in accordance with an embodiment.

FIG. 6 illustrates one embodiment for the hand skeleton detector 80 which comprises a hand joint estimation module 510 comprising convolutional layers and a post-processing module 520.

The hand skeleton detector 80 receives an image of a hand, i.e. a hand image, and estimates hand joints in the hand image. The hand image may be any image of a hand such as an image not specified in the system. Alternatively, the hand image may be a hand image cropped from an input image data 20 using a hand region (or bounding box) detected by the hand silhouette detector 70.

The hand joint estimation module 510 can be designed with a similar architecture that combines the architecture of the feature extraction networks 110 and 120 and the architecture of the 2D body joint estimation networks 210. In one embodiment, the hand skeleton detector 80 can be designed to directly receive the human-related image feature tensors from the feature extractor 30.

The post-processing module 520 for hand pose estimation takes the estimated heat maps and decides the candidates of joint locations and constructs a hand skeleton.

Figure 7:
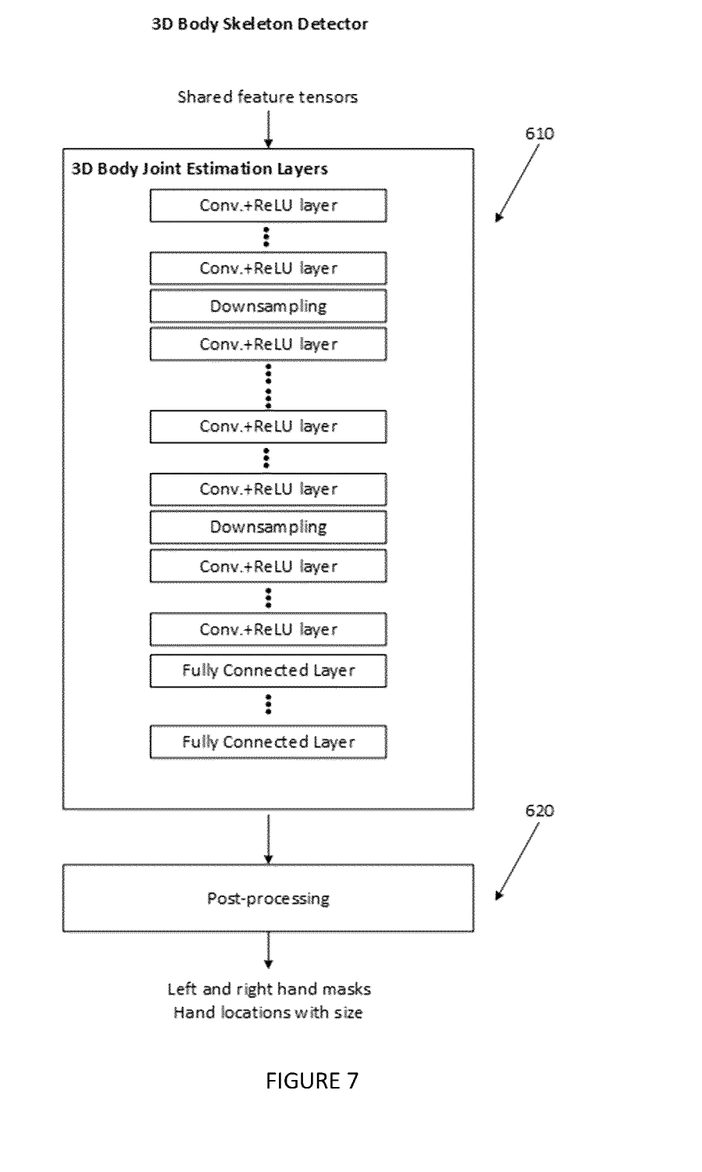
FIG. 7 is a block diagram illustrating the 3D body skeleton detector of FIG. 1, in accordance with an embodiment.

FIG. 7 illustrates one embodiment for the 3D body skeleton detector 90 which comprises a 3D body joint estimation module 610 comprising convolutional layers and a post-processing module 620.

The 3D body skeleton detector 90 is configured for estimating 3D coordinates of human body joints from a single image. The 3D body skeleton detector 90 receives human-related image feature tensors and estimates normalized 3D coordinates of a human body detected in an image. The post-processing module 620 is configured for mapping the normalized 3D locations into image and real-world spaces.

Figure 8:
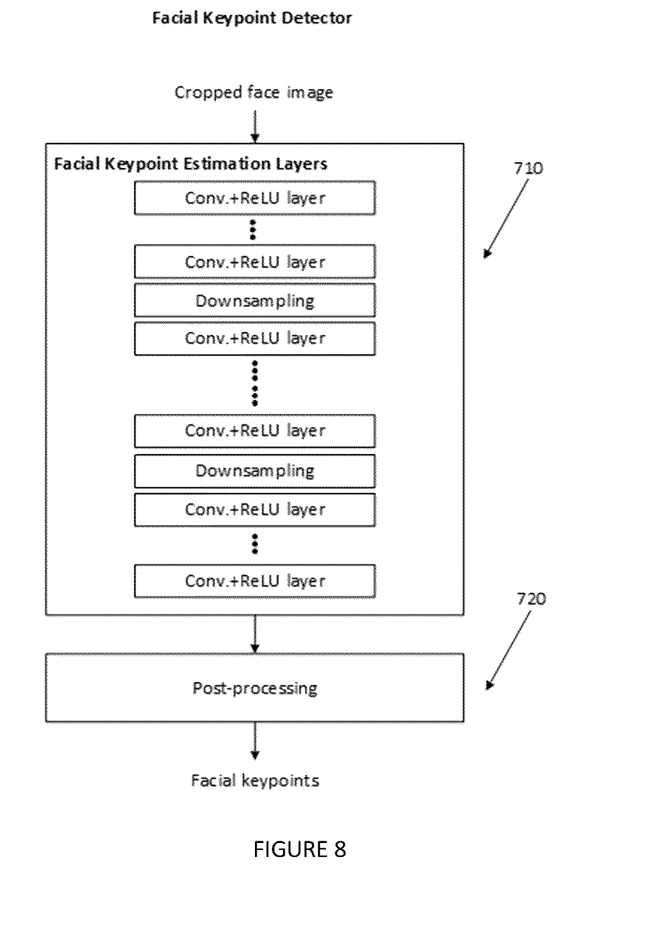
FIG. 8 is a block diagram illustrating the facial keypoint detector of FIG. 1, in accordance with an embodiment.

FIG. 8 illustrates one embodiment for the facial keypoints detector 50 which comprises a facial keypoints estimation module 710 comprising convolutional layers, and a post-processing module 720.

The facial keypoints detector 50 receives a cropped facial image decided by the 2D body skeleton detector 40 which estimates rough location of facial keypoints such as eyes, ears, nose, and/or the like. The locations of more detailed keypoints such as contour points of eyes, upper and lower lips, chin, eyebrows, nose, etc. are estimated by the convolutional layers of the facial keypoints estimation module 710. Alignment of detected facial keypoints and/or outlier filtering may be performed by the post-processing module 720.

It should be understood that the same human-related image features determined by the feature extractor 30 are shared by at least some of the detectors 40-90 to infer the human pose information. In one embodiment, the feature extractor 30 determines all the human-related image features that can be obtained from an image and stores them at each neural network layer in a tensor form.

In one embodiment, the feature extractor 30 can be designed by explicitly defining feature descriptors such as scale-invariant feature transform (SIFT) and histogram of oriented gradients (HOG). Such a feature extractor pre-defines image features regardless of the dataset.

In one embodiment, the extractor 30 and the detectors 40-90 are each provided with at least one respective processor or processing unit, a respective communication unit and a respective memory. In another embodiment, at least two of the group consisting of the extractor 30 and the detectors 40-90 share a same processor, a same communication and/or a same memory. For example, the extractor 30 and the detectors 40-90 may share the same processor, the same communication unit and the same memory. In this case, the extractor 30 and the detectors 40-90 may correspond to different modules executed by the processor of a computer machine such as a personal computer, a laptop, a tablet, a smart phone, etc.

While the above description refers to the system 10 comprising the detectors 40-90, it should be understood that the system 10 may comprise only one of the detectors 40-90. For example, the system 10 may comprise at least two of the detectors 40-90.

In one embodiment, the sharing of the same human-related image features between a plurality of detectors makes the analysis consistent and fast by minimizing computations for each detector.

Figure 9:
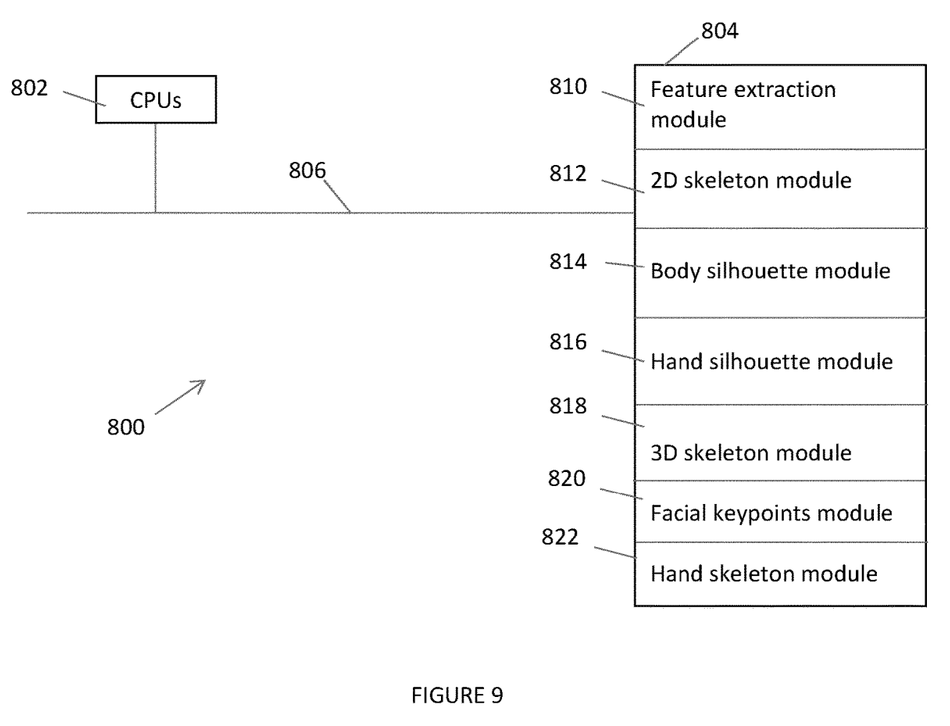
FIG. 9 is a block diagram of a processing module adapted to execute at least some of the steps of the extraction of human pose information, in accordance with an embodiment.

FIG. 9 is a block diagram illustrating an exemplary processing module 800 for executing the above described pose information extraction from an image, in accordance with some embodiments. The processing module 800 typically includes one or more Computer Processing Units (CPUs) and/or Graphic Processing Units (GPUs) 802 for executing modules or programs and/or instructions stored in memory 804 and thereby performing processing operations, memory 804, and one or more communication buses 806 for interconnecting these components. The communication buses 806 optionally include circuitry (sometimes called a chipset) that interconnects and controls communications between system components. The memory 804 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 804 optionally includes one or more storage devices remotely located from the CPU(s) 802. The memory 804, or alternately the non-volatile memory device(s) within the memory 804, comprises a non-transitory computer readable storage medium. In some embodiments, the memory 804, or the computer readable storage medium of the memory 804 stores the following programs, modules, and data structures, or a subset thereof:

- a feature extraction module 810 for extracting human-related image features from an image;
- a 2D body skeleton detection module 812 for estimating 2D body joint positions;
- a body silhouette detection module 814 for identifying and segmenting body silhouettes;
- a hand silhouette detection module 816 for identifying and segmenting hand silhouettes;
- a 3D body skeleton detection module 818 for estimating 3D body joint positions;
- a facial keypoints detection module 820 for estimating facial keypoint positions; and
- a hand skeleton detection module 822 for estimating hand joint positions.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, the memory 804 may store a subset of the modules and data structures identified above. Furthermore, the memory 804 may store additional modules and data structures not described above.

Although it shows a processing module 800, FIG. 9 is intended more as functional description of the various features which may be present in a management module than as a structural schematic of the embodiments described herein. In practice, and as recognized by those of ordinary skill in the art, items shown separately could be combined and some items could be separated.

The embodiments of the invention described above are intended to be exemplary only. The scope of the invention is therefore intended to be limited solely by the scope of the appended claims.

We claim:

1. A system for extracting human pose information from an image, the system comprising:
    a feature extractor for extracting features related to human joints and shapes from the image, the feature extractor being connectable to a database comprising a dataset of reference images and provided with a first convolutional neural network (CNN) architecture including a first plurality of CNN layers,
        wherein each CNN layer of the first plurality of CNN layers applies a nonlinear activation function to its input data using trained kernel weights, and
        wherein each CNN layer of the first plurality of CNN layers produces an output in the form of a tensor, such that the first CNN architecture outputs a plurality of tensors that are from different CNN layers and that collectively preserve the features;
    a two-dimensional (2D) body skeleton detector to which the plurality of tensors are provided, as input, to obtain, for each of multiple joints, a heat map that visually indicates a location of that joint,
        wherein the 2D body skeleton detector is provided with a second CNN architecture including a second plurality of CNN layers, and wherein the second CNN architecture accepts, as input, the plurality of tensors rather than the image; and
    a facial keypoints detector to which at least one of the multiple heat maps produced by the 2D body skeleton detector for the multiple joints is provided, as input, to obtain locations of one or more facial keypoints.

2. The system of claim 1, wherein the feature extractor comprises:
    a low-level feature extractor for extracting low-level features from the image; and
    an intermediate feature extractor for extracting intermediate features, the low-level features and the intermediate features forming together the features.

3. The system of claim 1, wherein at least one of the first CNN architecture and the second CNN architecture comprises a deep CNN architecture.

4. The system of claim 1, wherein one of the first and second pluralities of CNN layers comprises lightweight layers.

5. A method for extracting human pose information from an image, the method comprising:
    receiving an image;
    extracting human-related image features from the image using a feature extractor, the feature extractor being connectable to a database comprising a dataset of reference images and provided with a first convolutional neural network (CNN) architecture including a first plurality of CNN layers,
        wherein each CNN layer of the first CNN architecture applies a convolutional operation to its input data using trained kernel weights to produce an output in the form of a tensor, and
        wherein the first CNN architecture outputs a plurality of tensors that are from different CNN layers and that collectively preserve the human-related image features; and
    determining the human pose information by:
        providing the plurality of tensors to a two-dimensional (2D) body skeleton detector as input, so as to obtain, for each of multiple joints, a heat map that visually indicates a location of that joint,
            wherein the 2D body skeleton is provided with a second CNN architecture including a second plurality of CNN layers, and wherein the second CNN architecture accepts, as input, the plurality of tensors, and
        providing at least one of the multiple heat maps produced by the 2D body skeleton detector for the multiple joints to a facial keypoints detector as input, so as to obtain locations of one or more facial keypoints.

6. The method of claim 5, wherein the feature extractor comprises:
    a low-level feature extractor for extracting low-level features from the image; and an intermediate feature extractor for extracting intermediate features, the low-level features and the intermediate features forming together the human-related image features.

7. The method of claim 5, wherein at least one of the first CNN architecture and the second CNN architecture comprises a deep CNN architecture.

8. The method of claim 5, wherein one of the first and second CNN architectures comprises lightweight layers.

9. A method comprising:
applying, to an image, a feature extractor that extracts human-related features in the form of a plurality of tensors,
  wherein the feature extractor is provided with a first convolutional neural network (CNN) architecture having a first plurality of CNN layers, and
  wherein each CNN layer applies a convolutional operation to its input using trained kernel weights to produce, as output, one of the plurality of tensors; and
determining, based on the plurality of tensors output by different CNN layers in the first CNN architecture, pose information of a human body in the image by:
  providing the plurality of tensors to a two-dimensional (2D) body skeleton detector as input, so as to obtain, for each of multiple joints, a heat map that visually indicates a location of that joint, and
  providing at least one of the multiple heat maps produced by the 2D body skeleton detector for the multiple joints to a facial keypoints detector as input, so as to obtain locations of one or more facial keypoints of the human body;
wherein the 2D body skeleton detector is provided with a second CNN architecture having a second plurality of CNN layers; and
wherein the facial keypoints detector is provided with a third CNN architecture having a third plurality of CNN layers.

10. The method of claim 9, wherein the one or more facial keypoints include eyes, eyebrows, ears, nose, upper lip, lower lip, chin, or any combination thereof.

11. The method of claim 9, wherein said determining further comprises:
providing the plurality of tensors to a hand silhouette detector as input, so as to obtain (i) a first mask for a left hand of the human body and (ii) a second mask for a right hand of the human body,
applying the first and second masks to the image, so as to obtain (i) a first masked image that includes the left hand of the human body and (ii) a second masked image that includes the right hand of the human body, and
providing the first and second masked images to a hand skeleton detector that produces, as output, (i) a first location of the left hand of the human body and (ii) a second location of the right hand of the human body.

12. The method of claim 9, wherein a first subset of the first plurality of CNN layers is representative of a low-level feature extractor, and wherein a second subset of the first plurality of CNN layers is representative of an intermediate-level feature extractor.

13. The method of claim 12,
wherein the low-level feature extractor is configured for extracting low-level features that represent elemental characteristics of local regions in the image, and
wherein the intermediate-level feature extractor is configured for receiving the low-level features and determining intermediate features that correspond to high-level features by correlating the low-level features with shapes and/or relations of body parts.

14. The method of claim 13, wherein the elemental characteristics include intensities, edges, gradients, curvatures, points, object shapes, or any combination thereof.

15. The system of claim 1, wherein the nonlinear activation function is a rectified linear unit (ReLU).

* * * * *